(12) United States Patent
Hilsley et al.

(10) Patent No.: US 11,481,715 B2
(45) Date of Patent: *Oct. 25, 2022

(54) SEAL DELIVERY TRACKING SYSTEM

(71) Applicants: Ethan Hilsley, Surrey (GB);
Barrington Hilsley, Surrey (GB)

(72) Inventors: Ethan Hilsley, Surrey (GB);
Barrington Hilsley, Surrey (GB)

(73) Assignee: Physical 2 Digital Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,706

(22) Filed: Jun. 24, 2019

(65) Prior Publication Data
US 2019/0311323 A1  Oct. 10, 2019

Related U.S. Application Data

(62) Division of application No. 14/722,039, filed on May 26, 2015, now Pat. No. 10,332,062.

(60) Provisional application No. 62/004,771, filed on May 29, 2014.

(51) Int. Cl.
*G06Q 10/08* (2012.01)
*G09F 3/03* (2006.01)
*G06F 21/84* (2013.01)

(52) U.S. Cl.
CPC ....... *G06Q 10/0833* (2013.01); *G06Q 10/083* (2013.01); *G09F 3/0317* (2013.01); *G09F 3/0335* (2013.01); *G09F 3/037* (2013.01)

(58) Field of Classification Search
CPC .............. G06Q 10/0833; G06Q 10/083; G09F 3/0317; G09F 3/0335; G09F 3/037; G09F 3/00; G06K 19/06028

USPC ............................................... 705/333
See application file for complete search history.

(56) References Cited

U.S. PATENT DOCUMENTS

| | | | | |
|---|---|---|---|---|
| 7,336,183 B2* | 2/2008 | Reddy | ............. | G06K 19/07749 169/61 |
| 8,890,892 B2* | 11/2014 | Glynn | .................... | G06F 21/84 345/629 |
| 2004/0060976 A1* | 4/2004 | Blazey | .................. | G06K 19/08 235/375 |

(Continued)

FOREIGN PATENT DOCUMENTS

| | | |
|---|---|---|
| CN | 1359085 A | 7/2002 |
| CN | 101377893 A | 3/2009 |

(Continued)

OTHER PUBLICATIONS

International Search Report in connection with International Patent Application No. PCT/US2015/032444 dated Feb. 2, 2016.

(Continued)

*Primary Examiner* — Garcia Ade
(74) *Attorney, Agent, or Firm* — Knobbe Martens Olson & Bear LLP

(57) ABSTRACT

Systems and devices are provided for tracking deliveries and confirming delivery information with seals attached to the delivery vessel. In certain embodiments the seal includes a hidden number or code that is only viewable once the seal is broken or cut. The seal includes data and information that matches that of a corresponding delivery. Mobile devices and other computing devices can track the information that is input by the delivery personnel during the delivery process.

6 Claims, 19 Drawing Sheets

(56) References Cited

U.S. PATENT DOCUMENTS

| | | |
|---|---|---|
| 2006/0087431 A1 | 4/2006 | Shieh et al. |
| 2009/0295144 A1 | 12/2009 | Winkelhorn |
| 2010/0200155 A1 | 8/2010 | Mrocki et al. |

FOREIGN PATENT DOCUMENTS

| | | |
|---|---|---|
| CN | 101645215 A | 2/2010 |
| CN | 101808547 A | 8/2010 |
| CN | 101949237 A | 1/2011 |
| CN | 201972473 U | 9/2011 |
| CN | 102842054 A | 12/2012 |
| CN | 103068495 A | 4/2013 |
| CN | 103714462 A | 4/2014 |
| CN | 103810606 A | 5/2014 |
| FR | 2816434 A1 | 5/2002 |
| JP | 2003-026337 A | 1/2003 |
| JP | 2003-193722 A | 7/2003 |
| JP | 2004-231375 A | 8/2004 |
| JP | 2005-234497 A | 9/2005 |
| JP | 2005-313930 A | 11/2005 |
| JP | 06-011067 U | 1/2006 |
| JP | 2011-011760 A | 1/2011 |
| JP | 2013-257681 A | 12/2013 |
| KR | 1020170055448 A | 5/2017 |
| KR | 10-2017-0099480 A | 9/2017 |
| RU | 56039 U1 | 8/2006 |
| RU | 128379 | 5/2013 |

OTHER PUBLICATIONS

International Patent Application No. PCT/US2015/032444 filed May 26, 2015, Invitation to Pay Additional Fees, and Search Report dated Sep. 21, 2015.
Notice of Allowance for Korean Application No. 10-2018-7028553 dated Apr. 1, 2020, in 3 pages.
First Office Action for Chinese Application No. 201580038937.0 dated Apr. 1, 2020, in 16 pages.

* cited by examiner

Login

User Name

Password

Choose

Outgoing

Incoming

FIG. 7

| Select your Consignment |
|---|
| ABC123 |
| ABC456 |
| ABC789 |
| ABC321 |
| ABC654 |
| ABC987 |

FIG. 8

| Transport Details |
|---|
| ABC 123 |
| Vehicle license |
| Trailer number |
| Drivers name |
| Other |

| Select your Consignment |
|---|
| ABC123 |
| ABC456 |
| ABC789 |
| ABC321 |
| ABC654 |
| ABC987 |

FIG. 9

Confirm Installers name and Signature

First Name:
Last Name:
Company:

Signature: _____

FIG. 14

Choose

Outgoing

Incoming

FIG. 15

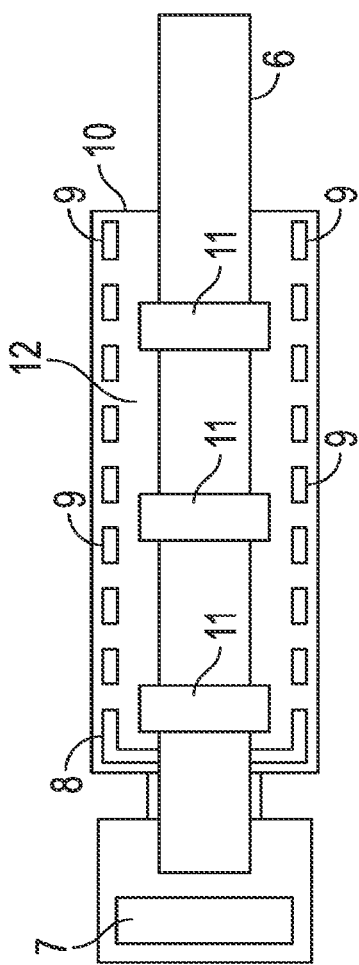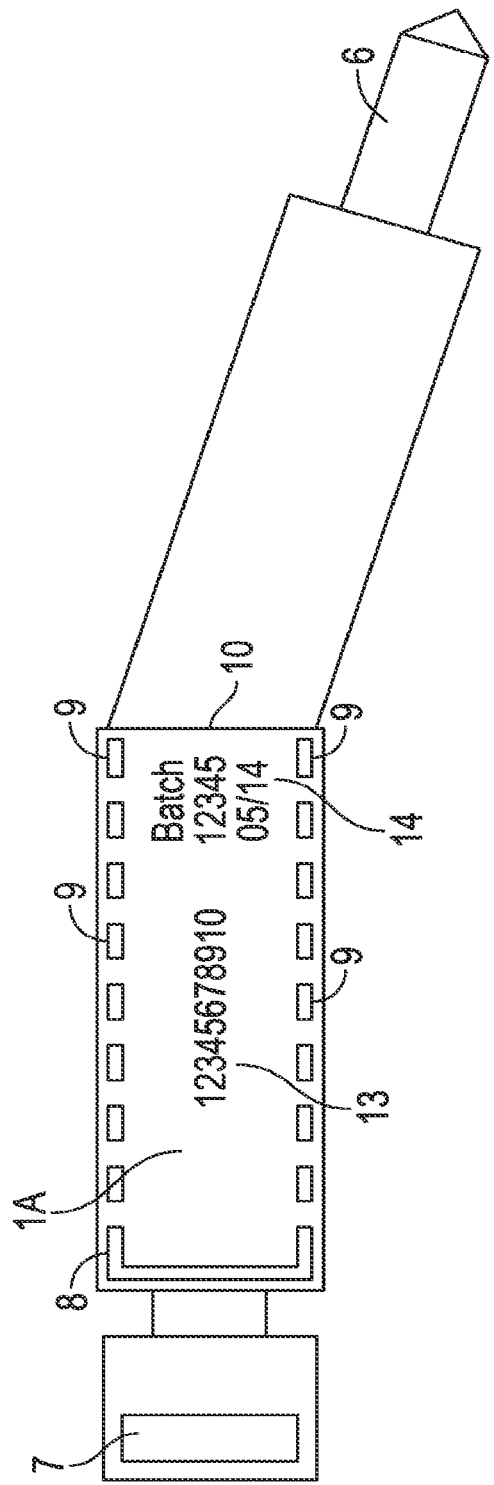
FIG. 26
FIG. 27

SEAL DELIVERY TRACKING SYSTEM

INCORPORATION BY REFERENCE TO RELATED APPLICATIONS

Any and all applications identified in a priority claim in the Application Data Sheet, or any correction thereto, are hereby incorporated by reference herein and made a part of the present disclosure.

BACKGROUND OF THE DISCLOSURE

Field of the Invention

Embodiments of the invention relate generally to delivery tracking systems and more specifically to delivery tracking systems that include a seal having delivery information.

Description of the Related Art

Delivery tracking systems can be used to ensure accuracy and integrity of deliveries from one location to another location. Many delivery trucks and other vessels perform multiple deliveries in a single trip or a single day. Often, there are multiple shipments or items to be delivered contained within a single truck or vessel that is taken to each of the delivery drop off locations. The delivery drop off locations for the multiple deliveries can be at many different locations. It can be very difficult for the shipper, truck driver and/or delivery personnel to keep track of each of the deliveries and mistakes are often made that result in incorrectly delivered items. Delivery companies desire systems that provide more security and additional confirmation steps that require the delivery personnel and/or those receiving the deliveries to confirm the accuracy of the delivery information as the deliveries occur. There is a need in the field for a system that is easy to use and cannot be bypassed by drivers or other delivery personnel during the delivery process.

SUMMARY OF THE DISCLOSURE

Preferred embodiments of the delivery system include a seal that is used to verify and confirm the accuracy of a delivery from one location to another. Preferred embodiments of the system are configured to include a seal having a form of readable data and a computing device that reads the readable data on the seal. The seal may also include a code that is hidden within the seal and only revealed when the seal is removed from the delivery vessel and damaged beyond further use. A software application can prompt a user to enter the hidden code once the seal has been broken in order to confirm that the seal correctly corresponds to the delivery and the delivery is correct.

A preferred embodiment involves a delivery tracking system comprising a server configured to store and provide information relating to multiple deliveries. The system also includes a mobile computing device having a wireless connection to the internet and a software application configured to prompt a user to enter information relating to a delivery. The delivery system also includes a seal configured to be attached to a delivery vessel, the seal containing information relating to a specific delivery. The server is in wireless communication with the mobile computing device and can send and receive information relating to deliveries to and from the mobile computing device. The seal contains a hidden code that is not viewable while the seal is attached to a delivery vessel but is viewable when the seal is broken and removed from the delivery vessel. The software application prompts the user to enter the hidden code contained in the seal.

In some configurations, the software application prompts the user to take a photograph of the seal. The software application can also prompt the user to provide a signature. The seal can only be removed from the delivery vessel by breaking the seal, and the seal cannot be reattached to the delivery vessel, in the same manner in which it was first attached, after the seal has been broken.

In some configurations, the seal includes a body and the hidden code is imprinted on the body, and a portion of the seal must be pulled back or removed to make the hidden code viewable. In other configurations, the software application prompts the user to confirm the GPS location of the mobile computing device and seal. The seal can include a barcode and the software application can prompt the user to scan the barcode.

A preferred embodiment involves a method for delivery tracking comprising attaching a seal to a delivery vessel, the seal containing information relating to a delivery, including a hidden code that corresponds to the delivery. The method can also include taking a photograph of the seal attached to the deliver vessel and entering it into a software application. The method further includes breaking the seal and removing it from the delivery vessel so that the hidden code is viewable. The method includes entering the hidden code into the software application.

In some embodiments, the method further includes the step of providing a signature to the software application. The method can also include the step of scanning a barcode on the seal. The method can also include the step of pulling back a portion of the broken seal to make the hidden code viewable. In some embodiments, the method also includes the steps of logging into the software application and selecting the type of delivery.

A preferred embodiment comprises a seal for use in tracking deliveries, and the seal comprises a body comprising having a tab portion having a flat surface and containing a form of data. The body also includes at least one clasping member and a break portion configured to be broken by a user to remove the seal from a delivery vessel. The seal also has a tail portion with a first end coupled to the body, and the tail portion has a second end that is configured to be received by the clasping member so that the second end passes through and engages the clasping member such that the tail cannot be removed from the clasping member without breaking the seal. The body includes a hidden code that is covered by the tail when the seal is installed, and when the seal is broken at the break portion the hidden code becomes viewable.

In some embodiments, the break portion is thinner than the adjacent portions of the body. In some embodiments, the tail portion overlaps itself when the seal is attached to a vessel and the tail extends through the at least one clasping member, and the hidden code is covered by two segments of the tail portion. In some embodiments, breaking the seal at the break portion requires breaking the body and also breaking the tail portion adjacent the break portion of the body. In some embodiments, the body includes an opening that is configured to receive the tail portion, the opening being adjacent the at least one clasping members. In some embodiments, the body includes one or more securing members configured to keep the tail portion close to the body.

BRIEF DESCRIPTION OF THE DRAWINGS

These and other features, aspects and advantages of the present invention are described below with reference to drawings of preferred embodiments, which are intended to illustrate, but not to limit, the present invention. The drawings contain 34 figures.

FIG. 6 illustrates a page provided by a software application in a delivery tracking system.

FIG. 7 illustrates a page provided by a software application in a delivery tracking system.

FIG. 8 illustrates a page provided by a software application in a delivery tracking system.

FIG. 9 illustrates a page provided by a software application in a delivery tracking system.

FIG. 14 illustrates a page provided by a software application in a delivery tracking system.

FIG. 15 illustrates a page provided by a software application in a delivery tracking system.

FIG. 26 is an additional back view of the seal of FIG. 24.

FIG. 27 is an additional back view of the seal of FIG. 24 with a tear off portion removed.

DETAILED DESCRIPTION OF THE PREFERRED EMBODIMENTS

Systems and methods described herein can be used to gather data and track deliveries using seal devices and mobile computing device applications that can communicate over the internet. Such mobile computing devices include, but are not limited to, mobile phones, laptop computers, tablets, delivery scanning devices, desktop computers, delivery truck computers, in-dash vehicle computers, or any other similar mobile computing device.

Preferred embodiments of the delivery tracking system disclosed herein are configured to track deliveries and confirm accuracy of deliveries and delivery information by use of one or more seals. Preferably, the system includes a seal or other device that includes an identifier or data, such as a barcode, NFC (Near Field Communication, RFID, etc.) or similar technology. Such seals include, but are not limited to, tags, loop structures, stickers, elongate locking structures, zip tie bands, U-shaped locking structures, and other similar structures or devices that can be coupled to a delivery vessel. Preferably, the seal or other device also includes an identifier such as a code that is hidden and unreadable without removing the seal or device. The code can be hidden within the seal so that it is only revealed by removing the seal and damaging the seal beyond any further use or reattachment. Thus, in some arrangements, when the seal is in place on the vessel and unbroken, the seal includes a visible identifier and also a hidden identifier. The barcode can be the visible identifier and the hidden code can be the hidden identifier. Preferably, the system also includes a computing device or system that includes software that allows it to read the data on the seal and also accept input of the code. The system and software can be configured to read the data and determine whether the code and data correspond to the correct delivery data and information.

Figure 1:
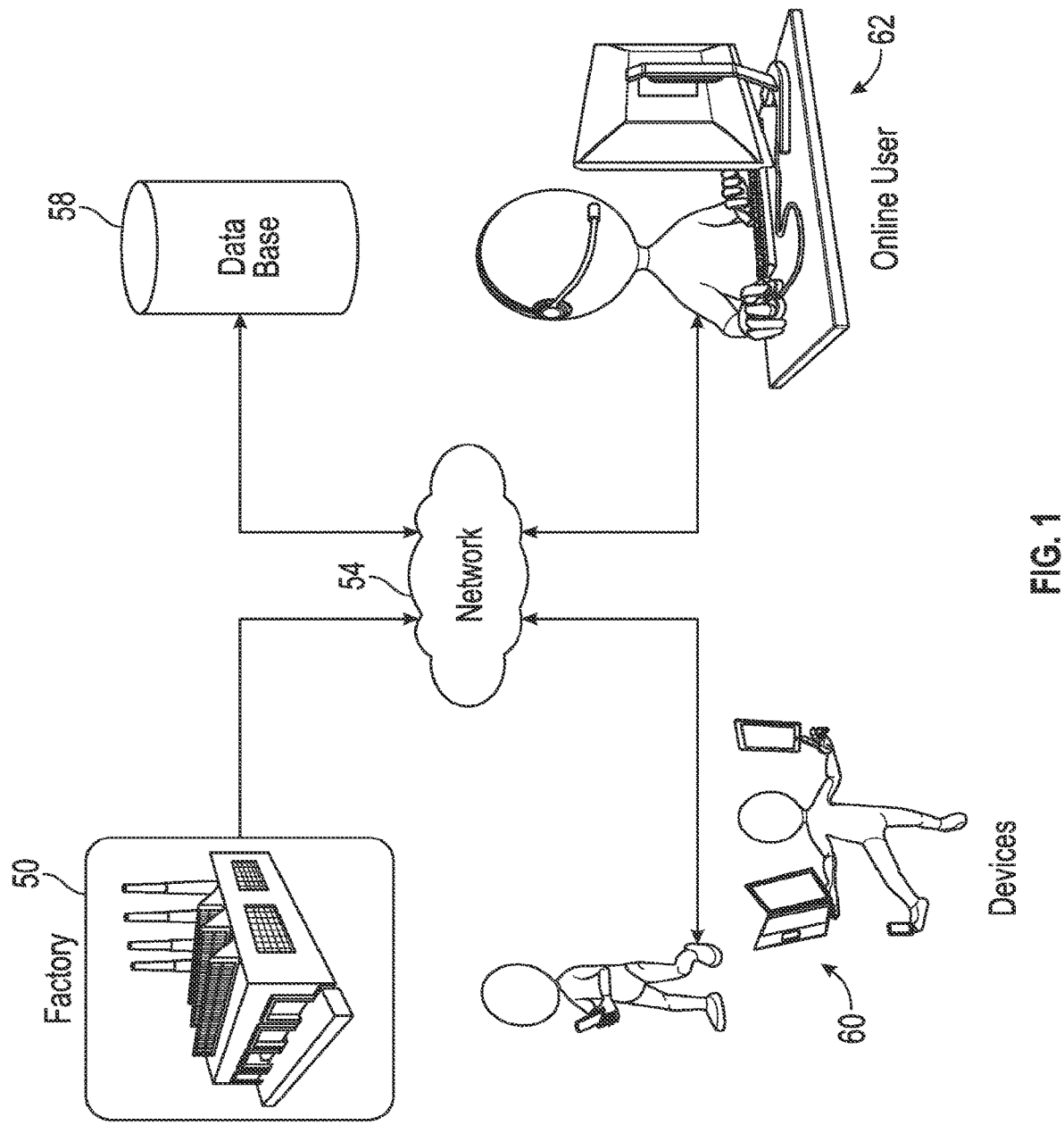
FIG. 1 schematically illustrates a system for tracking deliveries and processing data.

FIG. 1 illustrates an embodiment of a communications system for a delivery tracking system. In the communication system, a factory 50 can communicate with a network or cloud computing platform 54 and a database 58 to transfer barcode or NFC number information. The factory 50 can send a file that has barcode or other identification information, including batch number, to the network or cloud platform 54. The network or cloud 54 also communicates with the mobile devices 60 and computers 62 operated by online users for sending and receiving delivery information.

FIGS. 2, 3, 4 and 5 illustrate features and flowcharts with various steps that can be used in a system for tracking deliveries, as described herein. The delivery tracking system, in one or more configurations, can include a seal that is used to show the integrity of the delivery from one location to another location. An unbroken seal on the delivery vessel can indicate that the contents of the vessel have not been removed or tampered with. Preferably, the tracking system includes a seal and data that can be read on the seal, such as barcode, NFC (Near Field Communication, e.g., RFID) or similar existing or future technology. The seal can also include a code hidden within the seal that can only be revealed by removing the seal from the delivery vessel and damaging the seal beyond further use or attachment, at least without showing signs of tampering. The code can be a number(s), symbols, letters or any other suitable identifiers.

The system also preferably includes software and a general purpose computing device(s) that is configured to read the barcode/NFC and can accept input of the hidden code by a user. Preferably, in embodiments of the tracking system with a seal, this process can be used, not just with a regular nylon seal, but also adapted for use on all border approved seals such as C-TPAT (Customs-Trade Partnership Against Terrorism), AEO (Authorized economic operator), for example.

An embodiment of the tracking system includes a configuration that utilizes mobile device applications and wireless communication via the internet. To start the process, a person can use an online portal to enter in shipping numbers and the number of drops for that day (or other time period such as a half day or a week) for the particular delivery vessel (e.g., vehicle, trailer, container, etc.). The specific delivery addresses for the vessel can also be input into the system and the user can also enter or otherwise obtain/designate the location (e.g., GPS coordinates) of the delivery drops. Preferably, the system includes one or more software applications that can be downloaded and operated on mobile computing devices. By way of a cloud or other network, the software applications can communicate with the factory and/or database at which the delivery information is received and stored. Customers or other users at the delivery drop locations can download the software applications and use them to track or receive information regarding the deliveries. The system can notify these application users at each delivery location that the delivery will be delivered on a certain date and/or time. The software application can be developed for iOS, Android, Windows 8 or other operating systems.

In preferred embodiments, the system includes one or more seals that can be installed on the delivery vessel. The seal can be installed on a locking device or door portion of the vessel in a way that requires the seal to be broken in order to achieve access into the vessel. In some embodiments, the seal can be a band or loop structure that must be broken to release the locking device or open the door, and once the seal is broken it can no longer be reattached or secured around the locking device or door. Multiple seals can be used when the delivery vessel has multiple deliveries to make. In some embodiments, a separate seal is used for each separate delivery and the seal includes information that corresponds to a specific delivery. Preferably, when a seal is to be installed on the locking device or door of the delivery vessel, the person installing the seal can open the software application and enter the shipment number in the software application which will then provide access to the delivery information. The software can then instruct the installer to confirm the GPS is recording well and the details of the delivery are all correct. The installer may then also be asked to take photographs of the vessel, vessel contents and/or the corresponding seal. The installer can also use a device read the barcode on the seal or read the NFC tag. The installer can then install the seal and take the delivery to its drop off location at the first stop of the delivery vessel.

In some embodiments, the system software can store the GPS coordinates of various delivery locations. The delivery vessel or person driving the vessel and delivering the deliveries can have a mobile device with the system software installed. Preferably, as the delivery vessel approaches the delivery drop off location, the mobile device will detect that the GPS coordinates of the drop off are near and send a notification to the recipient, alerting them that the delivery is near. Preferably, the recipient also has a computing device, such as a mobile phone, tablet or computer with the mobile application installed so that they can access information relating to their deliveries. For example, when the delivery arrives at its drop off location, the recipient can open his mobile application and select the delivery to access information regarding the delivery. Either the person delivering or the recipient can scan the barcode or other data on the seal or read the NFC. They can also be prompted by the software regarding the integrity of the seal and may be asked to take a photograph of the seal first before it is broken in order to access the delivery goods. The application software can also prompt the user to input a hidden number or code on the seal. In some configurations, this hidden number or code is found by removing the seal and tearing or removing a back portion, as described further herein. The recipient or delivery personnel can then input the hidden number into the application and send a request to the system network or ultimately the origin of the delivery. The system can then check that that exact hidden number or code matches the barcode/NFC and that the delivery is the correct one for the recipient. If the number or code is not a match, the system can provide an appropriate alert and perhaps ask for additional information to attempt to determine the source of the problem. If the number or code is a match, this means that the seal is the exact one that was installed at the last location tracked through the software. The software application or the delivery personnel can then prompt the recipient to sign for the delivery.

In some embodiments, this sequence of delivery steps can be repeated with multiple deliveries and drop off locations for a single delivery vessel. Each of the deliveries can have its own corresponding seal with barcode, data and/or hidden number information thereon. For example, once the first delivery is made and confirmed, the driver of the vessel can then select the next step in the software application and scan in a new seal and take a photograph of it installed. The driver can then proceed to the next point of delivery and the process can repeat itself at each subsequent delivery with a new seal.

Figure 2:
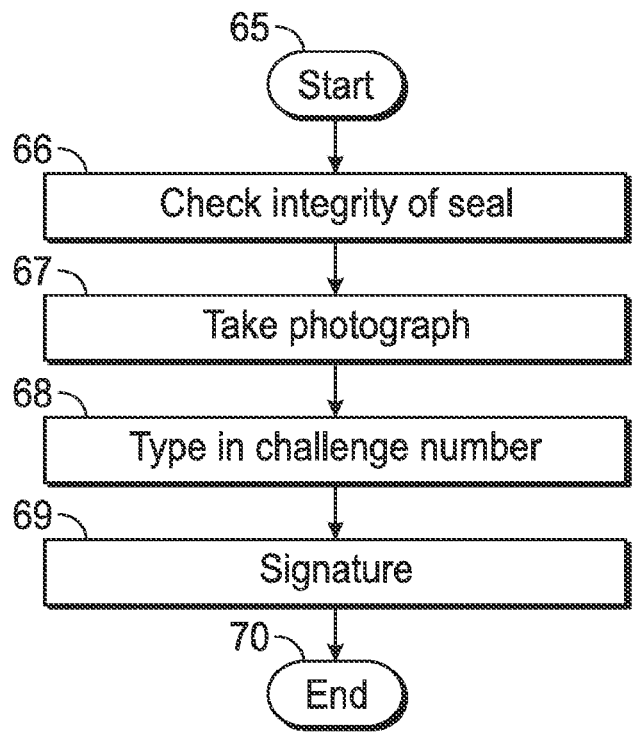
FIG. 2 is a flow chart that illustrates steps for tracking a delivery.
Figure 3:
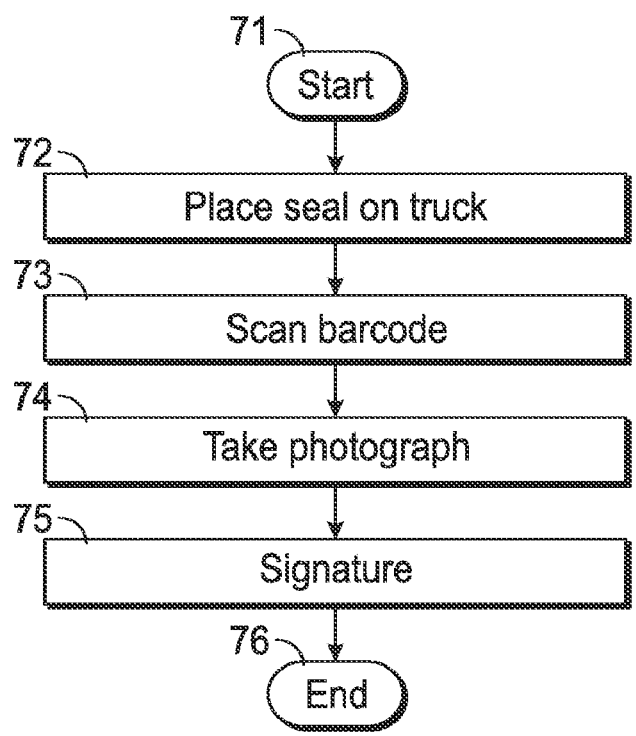
FIG. 3 is a flow chart that illustrates steps for tracking a delivery.
Figure 4:
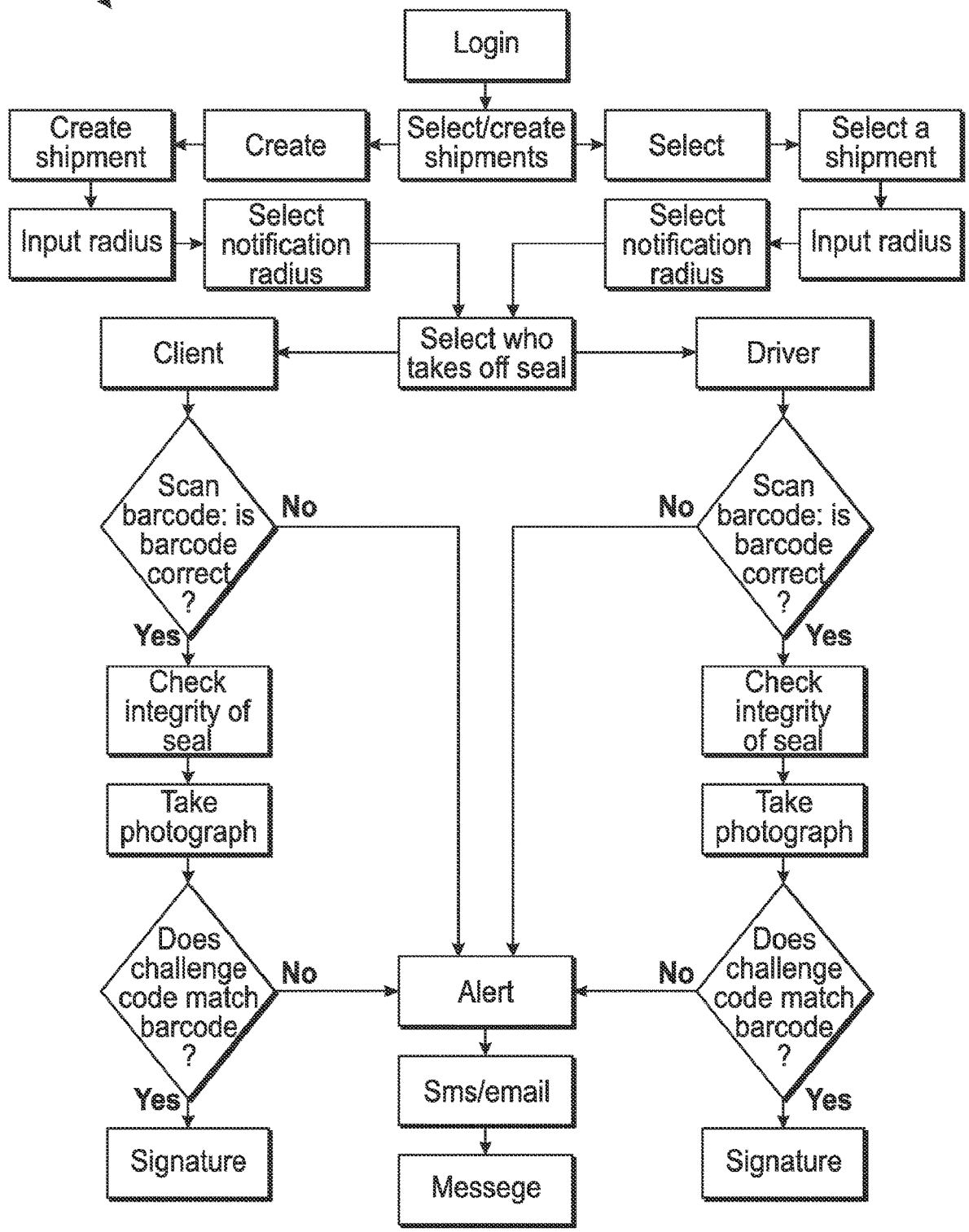
FIG. 4 is a flow chart that illustrates steps for an online portal for tracking deliveries.
Figure 5:
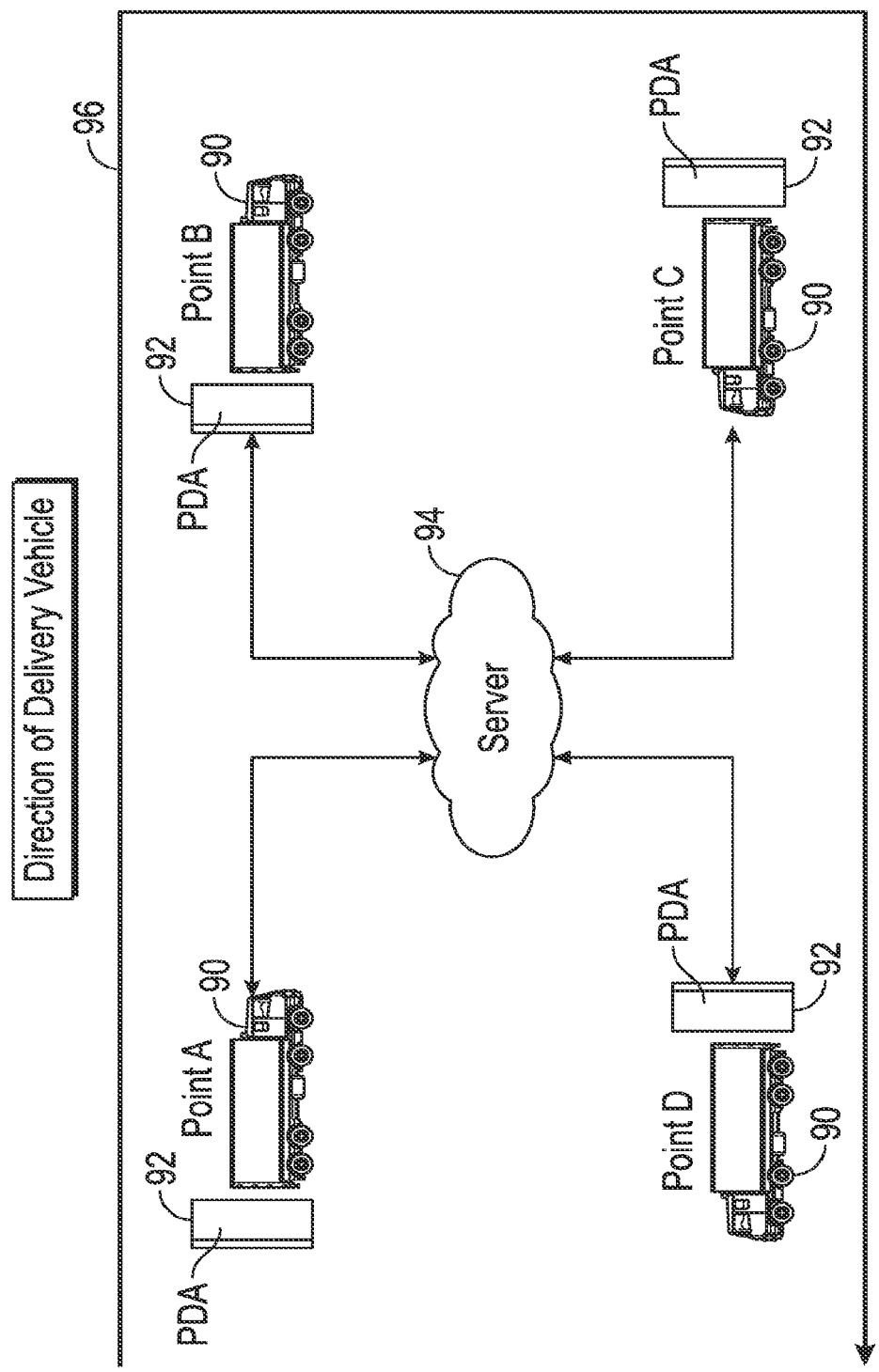
FIG. 5 schematically illustrates communication of a delivery vehicle with a server.

As shown in FIGS. 2 and 3, the software application may include the steps and promptings 65, 66, 67, 68, 69 and 70 of opening or starting the application, selecting the delivery, checking the integrity of the seal, taking a photograph, typing in a code or number, providing a signature, and submitting or ending. Alternatively, other embodiments of the software application may include the steps or promptings 71, 72, 73, 74, 75 and 76 of starting or opening, selecting the delivery, placing a seal on the vessel, scanning a barcode, taking a photograph, providing a signature, and submitting or ending. FIG. 4 shows detailed steps and information in a flowchart 80 for an embodiment of an online portal as part of the software of the system. A user can use this portal to input and receive information relating to one or move deliveries. FIG. 5 illustrates multiple stops of a delivery vehicle 90 and a PDA 92 that communicates with a server 94. The direction 96 of the delivery vehicle 90 is indicated as the vehicle 90 makes its multiple stops.

FIGS. 6 through 23 illustrate various aspects of embodiments of delivery tracking systems, including steps and processes of embodiments of the software applications. A delivery system can include all of these steps and processes, or can include only some of these steps and processes. These steps in the delivery process can occur in any order, and different configurations of the application software can include different groups or subgroups of these steps and processes. As illustrated in FIG. 6, a user of the software application can set up a login and password. When the user logs in, the application can request a password and/or a sequence from a multiple-digit password, such as an 8-digit password. For example if the password is "ABC12345," then the application might require the user to enter the $1^{st}$, $3^{rd}$, $4^{th}$ & $8^{th}$ digits of the password in four blank squares on the screen. The requested digits from the password could vary and be different each time the user logs in. Once the user has logged in, the application can also require, in the setup process online or automatically, that the user select an automatic logout setting that automatically logs out of the application in the following circumstances: (1) always stay logged in unless the computing device is turned off or reset, (2) log out at midnight each day, (3) log out after 1 hour of non use or (4) log out each time the app is opened. Once logged in to the application, a user can choose the shipment or delivery that they would like to track or for which they would like to receive information.

As illustrated in FIG. 7, the software application can provide a user with a screen having buttons or icons that allow the user to select either an outgoing delivery or an incoming delivery. If the user is the shipper or deliverer, then the application may provide an initial page as shown in FIG. 8. This is an option in the initial set up for the shipper. The system can be used by just scanning the barcode on the seal as a record of security. However if the shipper wishes to have a more detailed report online then they could input one or more consignment numbers allowing a shipping department to select one before scanning the seal. As shown in FIG. 9, the consignment or delivery number can be associated with a delivery vessel, driver and other information regarding the delivery. In the software application, a user can select a consignment or delivery number and the application can present a new page with details relating to that delivery or shipment. For example, the transport details can include the consignment number, the vehicle license number, the trailer number, the driver's name and other information relating to the consignment or delivery. These fields can be populated with information from the origin or factory, or they can be filed in by the user. There can be multiple fields to assign, and each field can be given a header by choice in the setup. The fields are preferably reportable in real time to the online system. The software application is in wireless communication with the cloud or network and can receive and transfer this information to and from the network, other mobile devices or the computers at the origin of the delivery.

Figure 10:
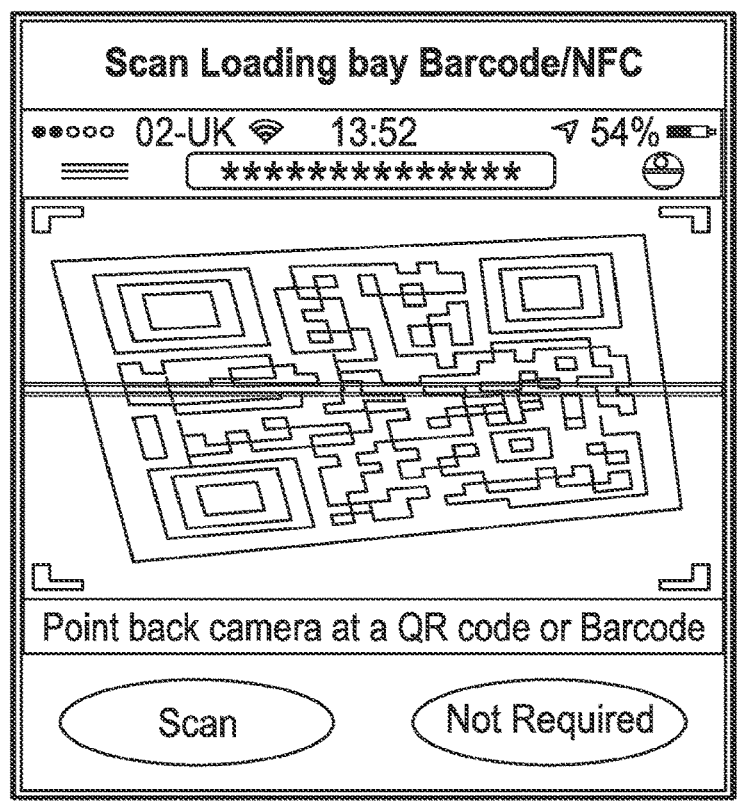
FIG. 10 illustrates a page provided by a software application in a delivery tracking system.
Figure 11:
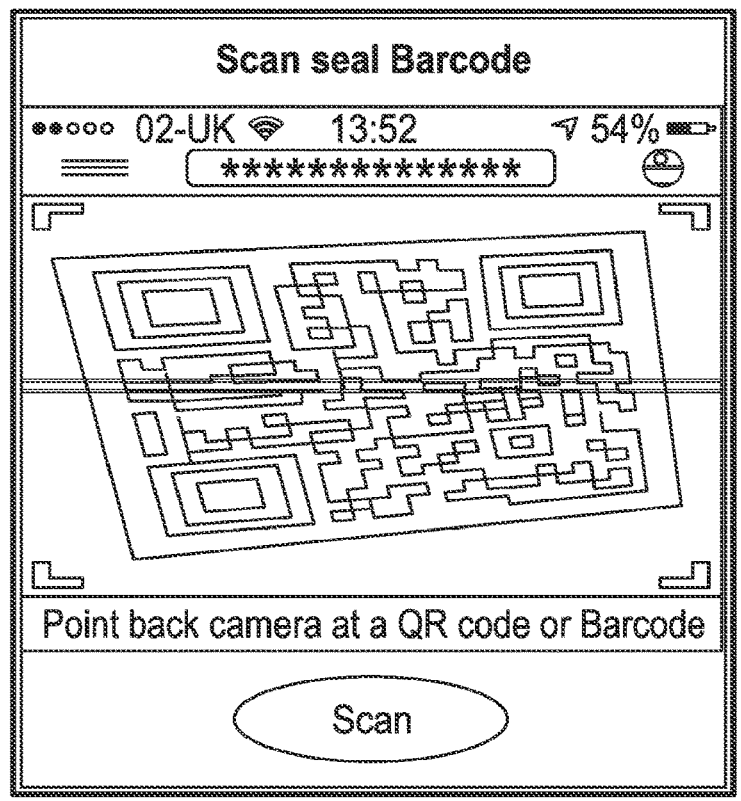
FIG. 11 illustrates a page provided by a software application in a delivery tracking system.

FIG. 10 illustrates an optional step in the process in which a user or client can have reported or tracked which loading bay the seal has left from. This option can be selected in the setup process of the application software. In either NFC or barcode format, the user can scan the NFC or barcode with a camera or scanner operably coupled to the mobile computing device. In some embodiments, once a correct read is collected by the user, a scan button or icon will change to red in color and another confirmation may be provided, such as a sound or vibrating. At this point the application can also display "CONFIRMING," while the scanned information is sent to the server or delivery origin. Once the communication has been sent to the server and the number or data assigned to the delivery, the application can provide confirmation by turning the icon green and/or displaying the word "PROCEED." Preferably, if there is no data signal the unit will display "NO INTERNET" and button or icon will display "TRY AGAIN" and can be colored yellow until it is found the data signal is established. As shown in FIG. 11, when either the NFC or Barcode is read by the scanner or camera, a box on the display can display the corresponding data or number. Preferably, the data or number can be disguised by the symbol "*" or some other symbol so that the user can see the information has arrived but cannot see the actual numbers or data. It is also preferable that the camera or scanner automatically assures that the flash is enabled on the mobile device.

Figure 12:
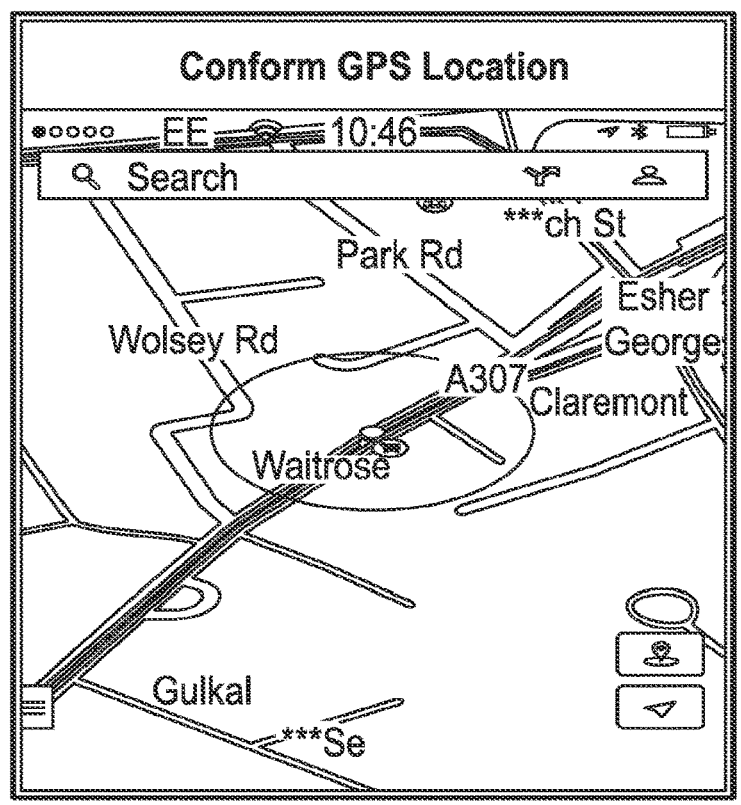
FIG. 12 illustrates a page provided by a software application in a delivery tracking system.

The software application can also be configured to allow a user to confirm the GPS location of a delivery. As shown in FIG. 12, the application can provide on the screen of the computing device a mapping screen in which the location can be determined and shown. The application can prompt the user with language such as "PRESS TO LOCATE" to press a certain icon or button on the screen. When the user presses the icon, similar to a location arrow on a GPS map service, the application will determine and show the location of the computing device and the delivery. The application can then prompt the user to "PROCEED" to the next step. The software will save this GPS location information and add it to the file or information relating to the subject delivery.

Figure 13:
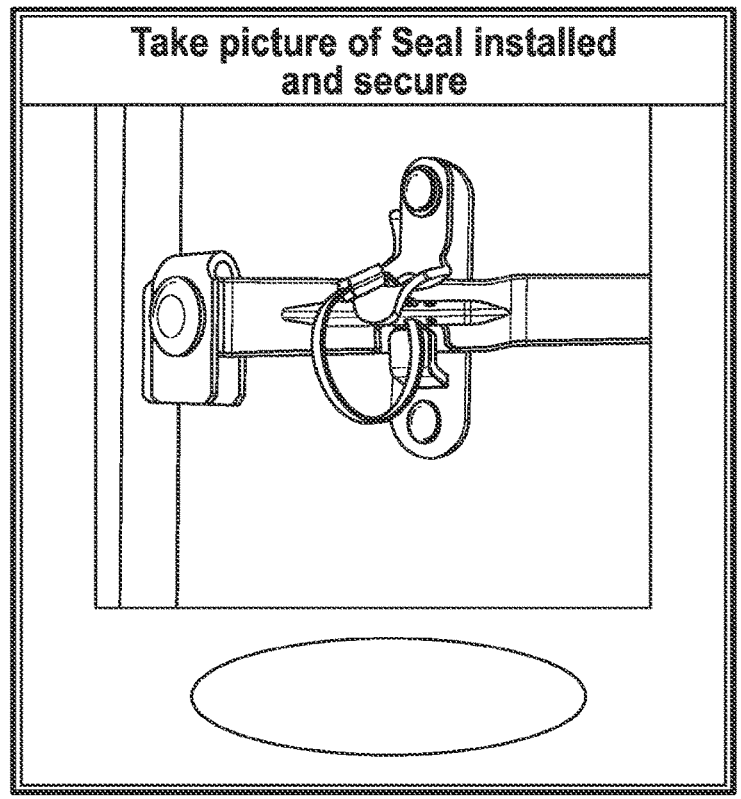
FIG. 13 illustrates a page provided by a software application in a delivery tracking system.
Figure 16:
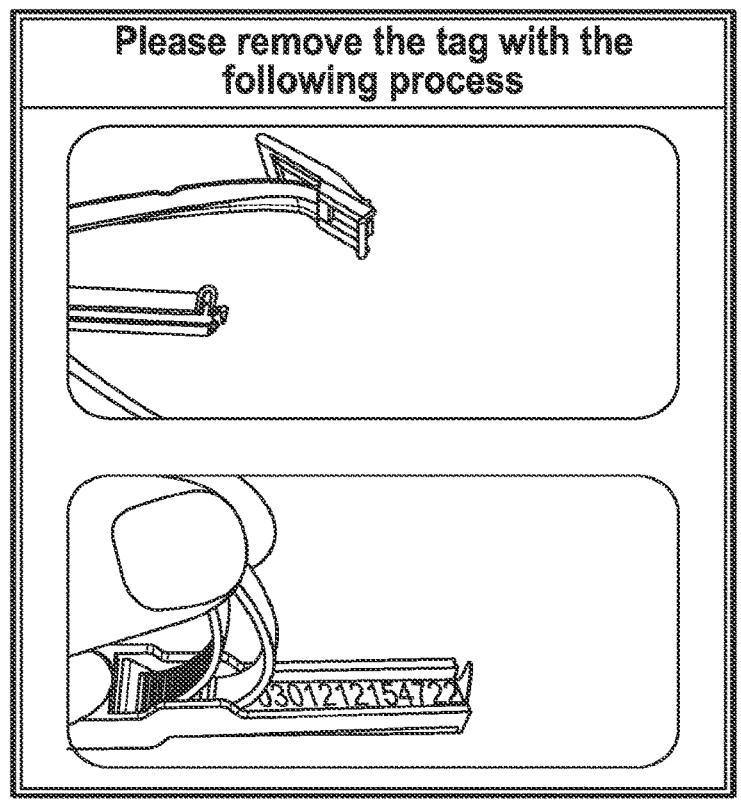
FIG. 16 illustrates a page provided by a software application in a delivery tracking system.

As illustrated in FIG. 13, the tracking system can also include the step of taking a photograph of the seal installed on the delivery vessel. In some embodiments, the software application will automatically open the camera and viewing screen that is part of or operably coupled to the computing device. With the camera taking capabilities ready and the viewing screen in camera mode on the screen of the computing device, the application prompts the user to take a photograph of the installed seal. In one embodiment, the application includes an icon or button that says "TAKE PICTURE" and once the device has taken the picture it will prompt the user to "SAVE" or "CLEAR." This is done to make sure the photograph was proper and in focus before saving. When the user prompts the device to save or presses the "SAVE" button, the application automatically sends the photo to the network or server to be part of the information stored for the delivery and then its prompts the user to proceed to the next step. Preferably, the camera on the device is configured to automatically enable its flash capabilities before the user takes the photo. Also, once the photograph is transmitted and stored with the other delivery information, it can be deleted from the device in order to preserve memory.

As illustrated in FIG. 14, the application can include a screen in which the installer of the seal confirms his or her information and provides a signature. This screen or page can automatically appear on the device and shows the information of the user or installer of the seal. Preferably, this application page will automatically turn to a landscape orientation on the device screen and the application will require that the user sign the screen with either their finger or other writing instrument. This confirms that the installer's name and information are correct and that the user has logged in correctly. Then, after the installed seal and other information has been confirmed, the application can bring up the delivery selection screen, as illustrated in FIG. 15. The user can then begin the process for a new delivery by selecting whether they are to do an outgoing or incoming delivery.

The following description relates to the process and steps that can be taken once the delivery vessel has arrived at a delivery location. However, in a situation of a truck or vessel performing multiple deliveries and multiple drop off locations in a single day, if a consignment number is used that is carried through each of the drop off locations, it can be required that the report show every one of the steps and information from all of the deliveries or drop off locations as one file provided to the original shipper. If the truck or vessel is contracted to perform multiple pickups from different clients and multiple deliveries, then preferably the vessel or truck company will be provided with one file, but each client shipper will only be able to see their relevant pickup and drop. In some arrangements, the server and database requires the process to be secure in this process and that it complies with security and data protection processes.

For an incoming shipment or delivery, the user of the application can use a camera or scanner on a mobile computing device to read the barcode or data on the delivery. Similar to the discussion above with respect to FIGS. 10 and 11, a user or client can have reported or tracked which loading bay the seal has left from. This option can be selected in the setup process of the application software. In either NFC or barcode format, the user can scan the NFC or barcode with a camera or scanner operably coupled to the mobile computing device. In some embodiments, once a correct read is collected by the user, a scan button or icon will change to red in color and another confirmation may be provided, such as a sound or vibrating. Once the communication has been sent to the server and the number or data assigned to the delivery, the application can provide confirmation by turning the icon green and/or displaying the word "PROCEED." When either the NFC or Barcode is read by the scanner or camera, a box on the display can display the corresponding data or number. Preferably, the data or number can be disguised by the symbol "*" or some other symbol so that the user can see the information has arrived but cannot see the actual numbers or data.

As described above with regard to FIGS. 12 and 13, the software application can also be configured to allow a user to confirm the GPS location of a delivery. The application can prompt the user with language such as "PRESS TO LOCATE" to press a certain icon or button on the screen. When the user presses the icon, similar to a location arrow on a GPS map service, the application will determine and show the location of the computing device and the delivery. The software will save this GPS location information and add it to the file or information relating to the subject delivery. The tracking system can also include the step of taking a photograph of the seal installed on the delivery vessel. The application prompts the user to take a photograph of the installed seal. In one embodiment, the application includes an icon or button that says "TAKE PICTURE" and once the device has taken the picture it will prompt the user to "SAVE" or "CLEAR." When the user prompts the device to save or presses the "SAVE" button, the application automatically sends the photo to the network or server to be part of the information stored for the delivery and then its prompts the user to proceed to the next step.

The application can include a screen in which the installer of the seal confirms his or her information and provides a signature. This screen or page can automatically appear on the device and shows the information of the user or installer of the seal. As illustrated in FIG. 14, this confirms that the installer's name and information are correct and that the user has logged in correctly.

The software application preferably includes a page instructing the user to remove the seal or tag by cutting it or breaking it. For example, the page illustrated in FIG. 16 includes instructions to remove the seal and shows pictures of how the seal should be broken or cut. The page also shows the user how to properly find and view the hidden number or code within the seal. Preferably, once the seal has been broken, it cannot be reused or reattached to the vessel. Also, the seal can have a designated portion or area on the seal where it is to be properly broken. If the user breaks or cuts the seal in the designated area, then the hidden code will become viewable so that it can be input into the application.

Figure 17:
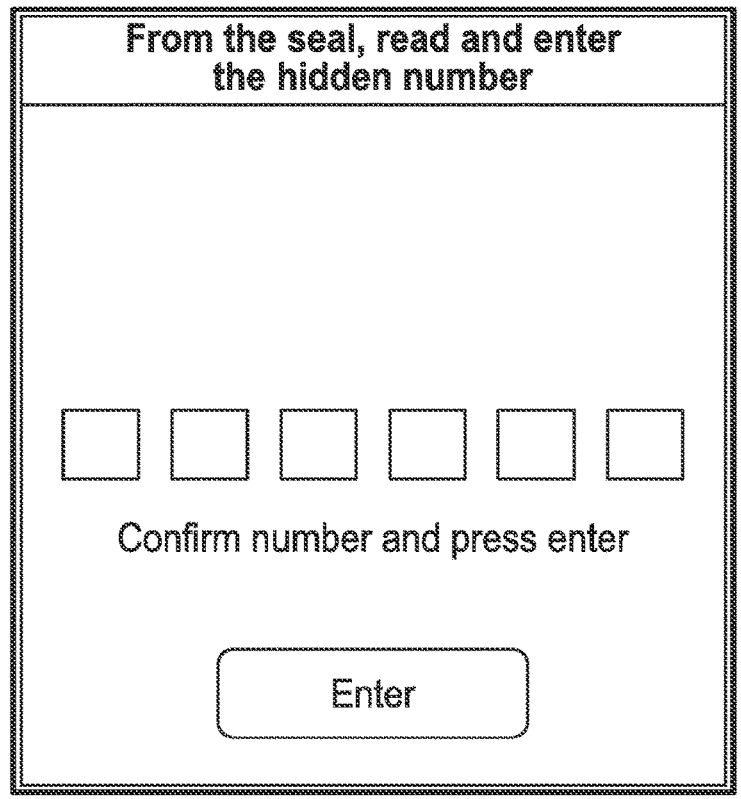
FIG. 17 illustrates a page provided by a software application in a delivery tracking system.

The application can then prompt the user to input the hidden number or code into the computing device. For example, as illustrated in FIG. 17, the application can include a page in which the user is prompted to read the hidden number on the seal and enter it into the blank fields on the page. Preferably, the fields for the hidden number are individual boxes for each digit or letter. When entering the numbers or letters into the boxes, the application can automatically move to the next box after a letter or number is entered into the previous box. When all of the fields or boxes are filled with the hidden number, the user can then press an icon labeled "CHECK" or "ENTER."

Figure 18:
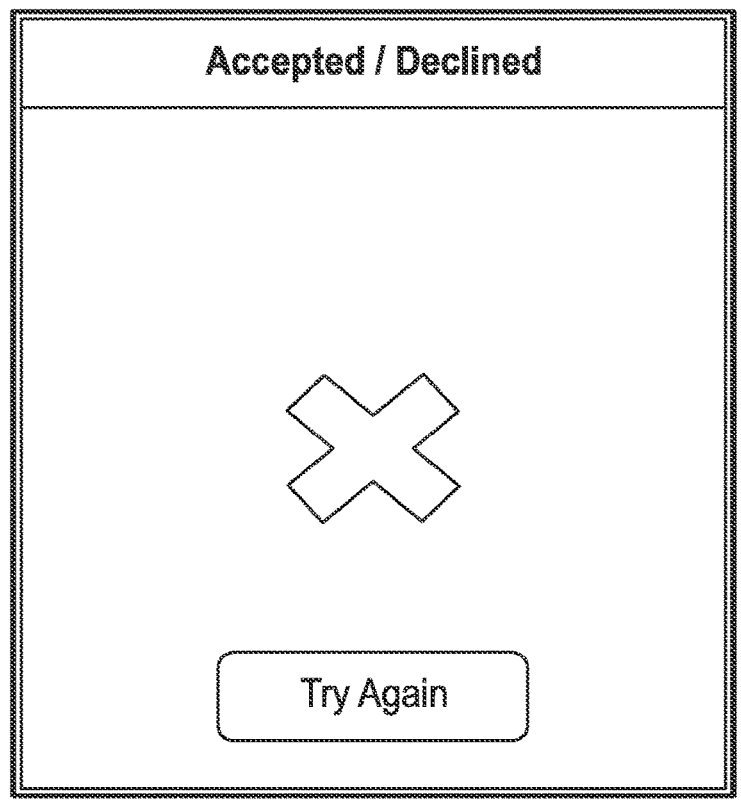
FIG. 18 illustrates a page provided by a software application in a delivery tracking system.
Figure 19:
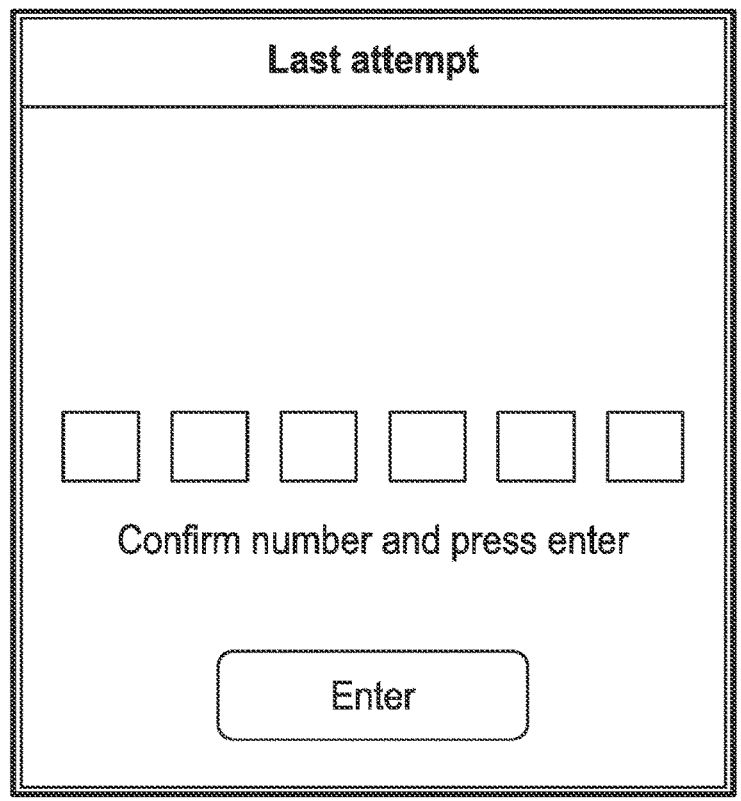
FIG. 19 illustrates a page provided by a software application in a delivery tracking system.
Figure 20:
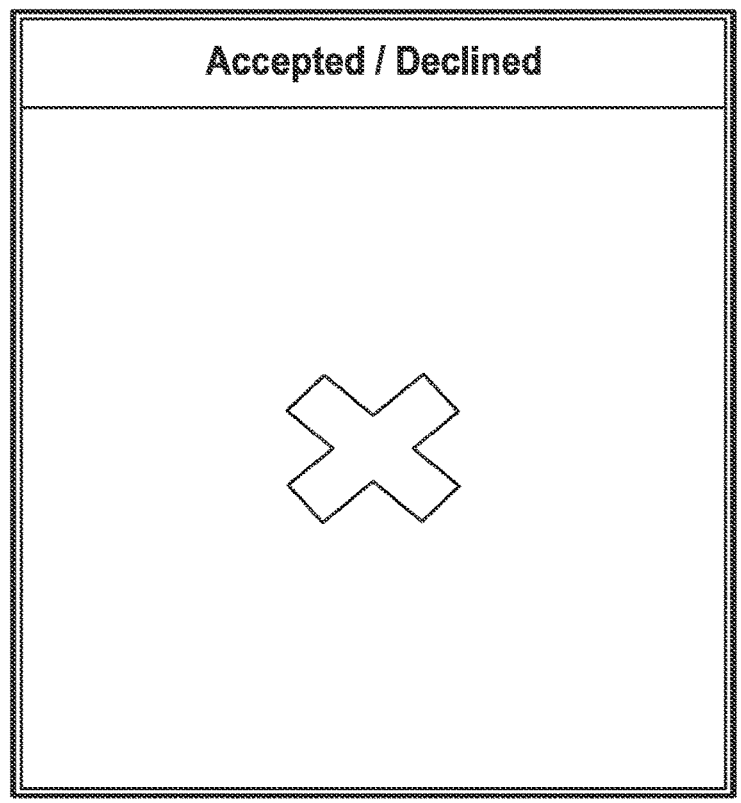
FIG. 20 illustrates a page provided by a software application in a delivery tracking system.

The application and software are configured to receive the input hidden number and compare it to the other information for the subject delivery. If the entered hidden number does not match the designated number or other information for that delivery, then the application can present a page notifying the user that the entered hidden number does not match. For example, as illustrated in FIG. 18, the application can present a page on the screen that says "NO MATCH" or includes a red "X" or other symbol to signify that the input number does not a match the number given to that delivery. The application can also prompt the user to try entering the hidden number again. The application can then allow the user to repeat entering in the hidden number into the fields and pressing the "ENTER" icon. Preferably, the application only provides the user with a certain number of attempts at entering in the hidden number. For example, the application can limit the user's attempts to two or three and on the final attempt can present a page that says "LAST ATTEMPT," as illustrated in FIG. 19. If the user fails to provide a matching hidden number on all the allowed attempts, the application can provide a page that indicates that the hidden number is not a match and is declined. Preferably the page includes a field in which the administrator can include a message that will be displayed to the user acknowledging that the seal's hidden number is incorrect and providing other desired information, as illustrated in FIG. 20. Preferably, in the initial setup, the software will have an option for the administrator to have messages automatically sent via SMS or email to specific recipients displaying a message that has been pre-set by the Administrator. It can also include data and information in the message, such as the user's name, location, phone number, etc.

Figure 21:
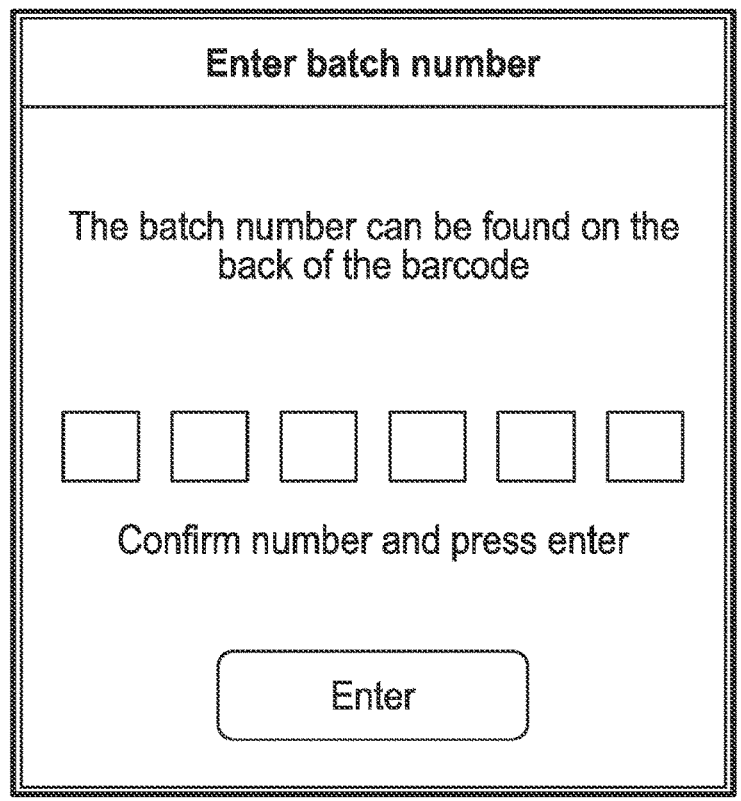
FIG. 21 illustrates a page provided by a software application in a delivery tracking system.

The application may also include a page in which a user enters the batch number for a delivery. As illustrated in FIG. 21, the application can include a page in which it prompts the user to enter the batch number which is on the back of the barcode on the seal. The page includes a field for the batch number and can include individual boxes for each letter or number of the batch code. Preferably, when a box is filled, the application automatically moves to the next box so the user can enter the next number or letter. When the batch number field is completely filled, the user can press the "CHECK" or "ENTER" icon on the page and the application will process the entered number. Preferably, the software sends the report on the delivery information to the origin of the shipments, including all the information gathered in the process of the delivery transaction and the additional batch number.

Figure 22:
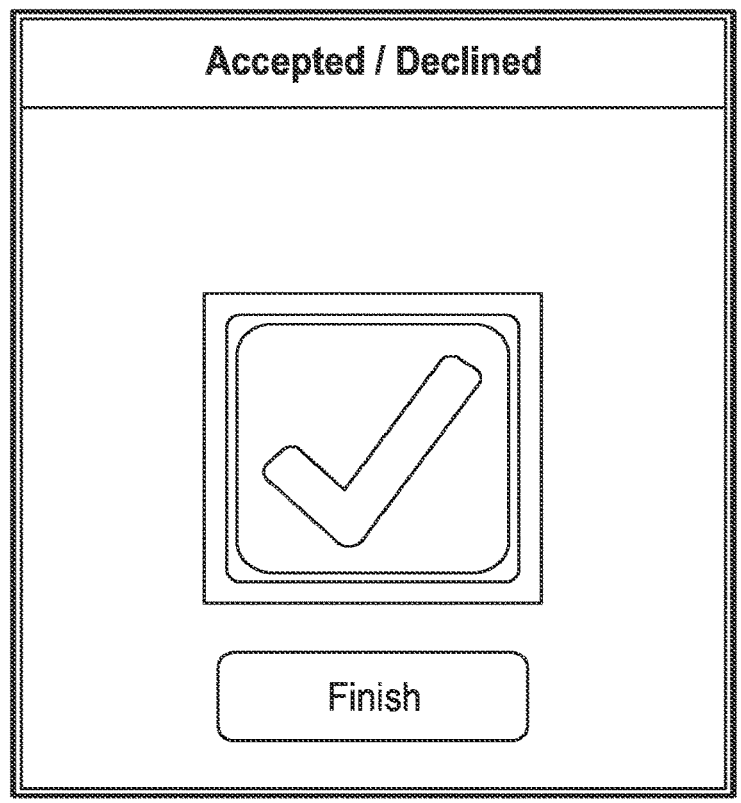
FIG. 22 illustrates a page provided by a software application in a delivery tracking system.
Figure 23:
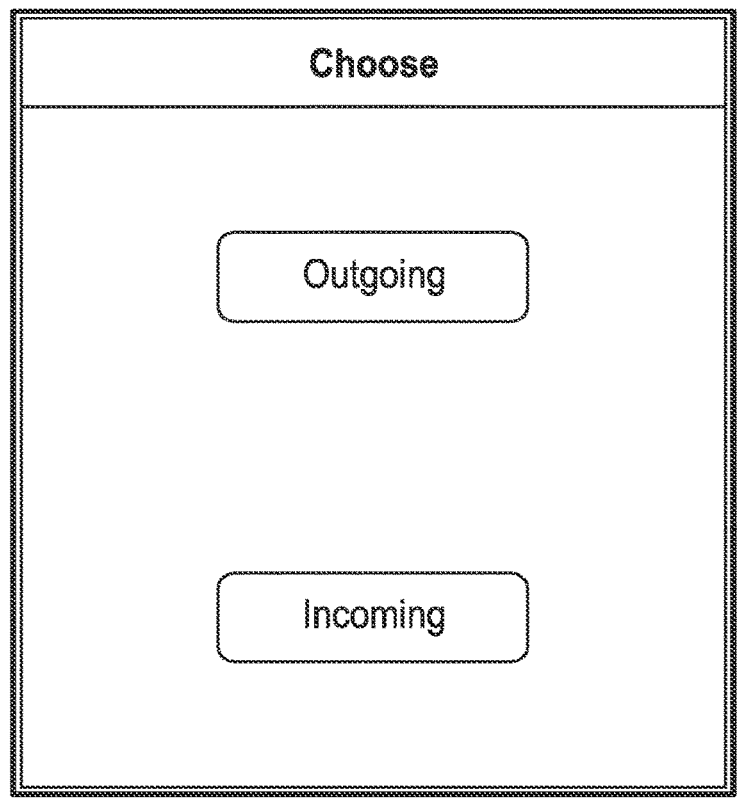
FIG. 23 illustrates a page provided by a software application in a delivery tracking system.
Figure 24:
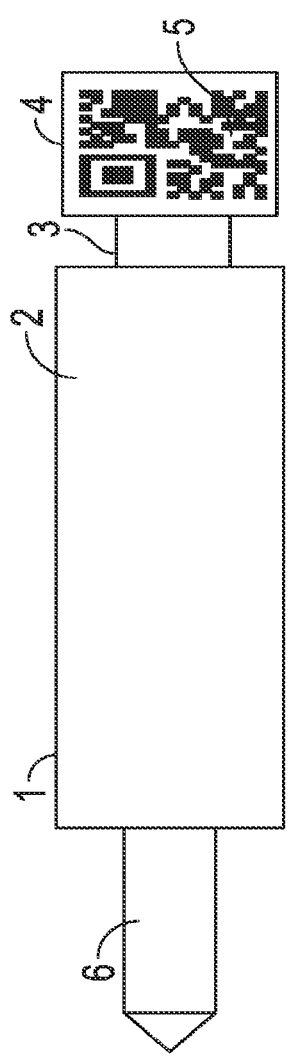
FIG. 24 is a front view of an embodiment of a seal used in a delivery tracking system.

Preferably, if the entered hidden code matches the other information for the delivery and corresponds to the delivery, then the application can provide a page showing that the code has been accepted. For example, as illustrated in FIG. 22, the application can provide a page that indicates that the entered hidden code is accepted and corresponds to the delivery being delivered. The page can include a check mark or other symbol indicating that the hidden code is correct. The page can also include an icon which prompts the user to finish the delivery tracking process. When the user has finished the delivery and entering the information from the seal, the application allows the user to select a new delivery or shipment, as illustrated in FIG. 23. This process can be repeated for numerous shipments on the same vessel and delivered on the same or different days.

FIGS. 24 through 28 illustrate an embodiment of a seal that can be used in the various embodiments of the delivery tracking system. Preferably, the seal includes a body 1 and tail portion 6. The body of the seal 1 and the tail portion 6 can be constructed of multiple different materials or a single material. Preferably, the body and tail are primarily made of nylon or a different polymer or plastic material. Preferably, the seal also includes a tab portion 4 that can be square or rectangular shaped and is coupled to the body 1. The tab portion 4 can include identification data such as a barcode, NCF, or other data source. The tab portion 4 can also be coupled to the body 1 via a neck portion 3. The seal also includes a front side 2 that preferably includes a space for a logo or other demarcation.

Figure 25:
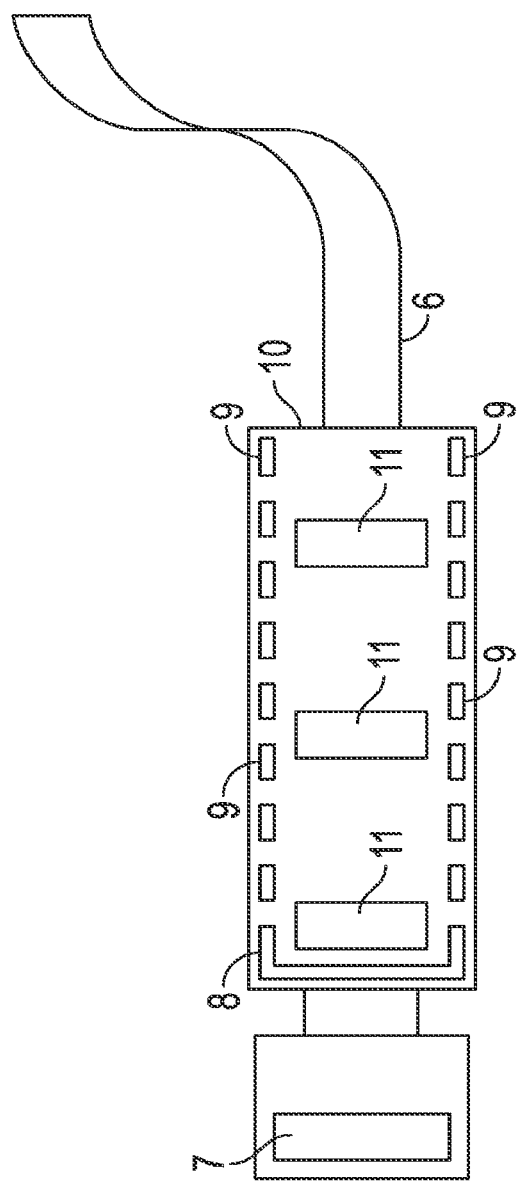
FIG. 25 is a back view of the seal of FIG. 24.

As illustrated in FIG. 25, the seal also includes a back side that has receiving or clasping members 11. The receiving or clasping members 11 are configured to receive at least a portion of the tail portion 6. The clasping members 11 preferably include locking features that engage corresponding locking features on the tail portion 6. These locking features can be ridges or ribs, for example, they can be similar to features found on zip tie products in which a tail is securely held by a clasping member. Preferably, once the tail portion 6 has been inserted into and engaged by the clasping member 11, it cannot be released or pulled back through the clasping member 11. This requires that the seal be cut or broken in order to remove it from something. In the illustrated embodiment, the body 1 includes multiple clasping members 11, but in other embodiments the body 1 includes only one clasping member 11. The tab portion 4 can also include a clasping member 7 that is the end clasping member 7 and the last one that the tail portion 6 passes through. Preferably, the seal also includes a tear-off portion 10 with perforations in the body material that form a perforated line 9. The tear-off portion 10 can be pulled back away from the body 1 and the body can include a hidden number or code underneath the tear-off portion 10.

In one preferred embodiment, the body 1 can be approximately 2 to 4 inches long, approximately one to two inches wide, and approximately ⅙ to ½ inches thick. In another embodiment, the body can be approximately 3 inches long, approximately 1⅛ inches wide, and approximately ¼ inch thick. The front side 2 of the body 1 of the seal includes a logo or other identifier. The neck portion 3 can be approximately ½ inch long and ¾ inch wide. Attached to the body 1 via the neck portion 3 is the square tab 4. Preferably, the tab 4 is made from the same or similar material as the body 1 and/or tail portion 4. In one preferred embodiment the tab portion is 1⅛ inches by 1⅛ inches square and includes a two dimensional barcode 5 installed upon it. The tab portion can also be other rectangular shapes and sizes and can include other types of code and data. The barcode 5 can hold a specific number sequence that corresponds to the file created for the delivery or shipment.

Figure 28:
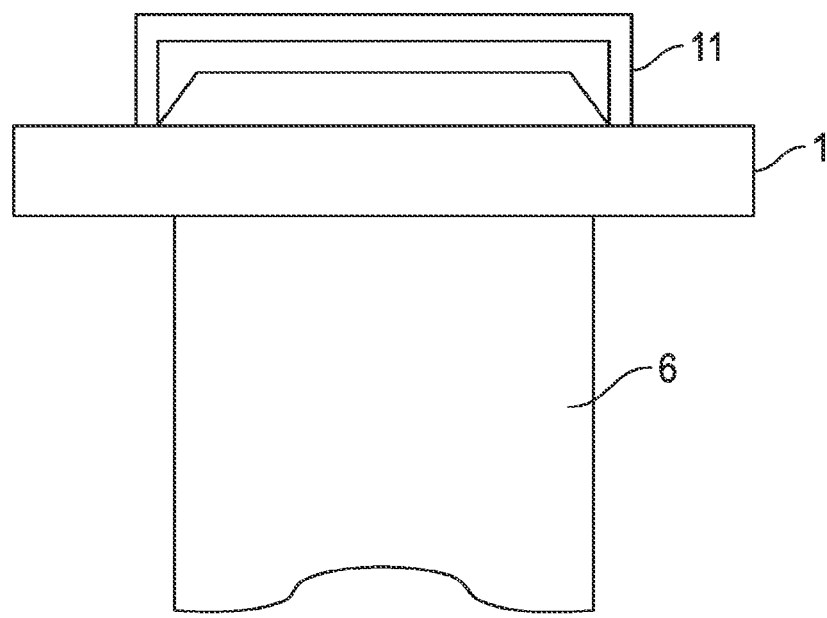
FIG. 28 is a cross sectional view of the body of the seal of FIG. 24.
Figure 29:
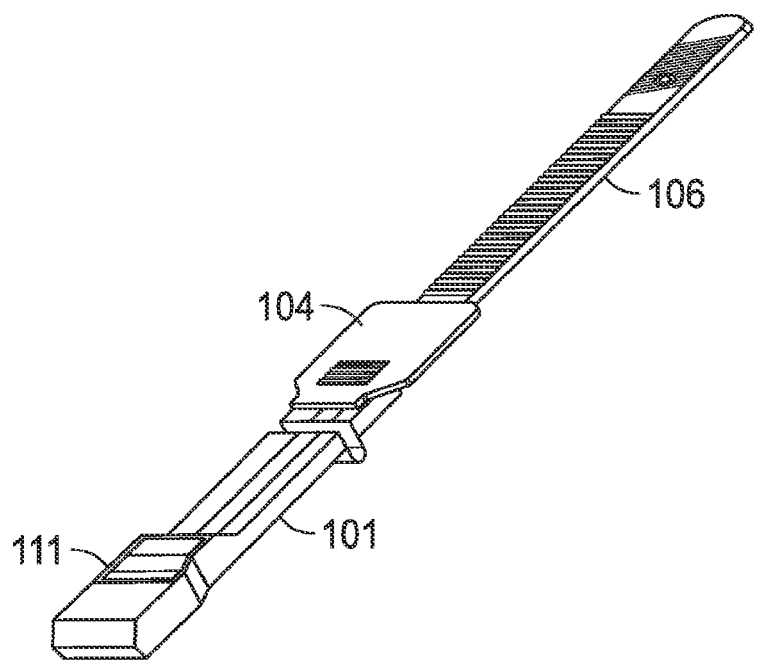
FIG. 29 is a perspective view of an embodiment of a seal used in a delivery tracking system.
Figure 30:
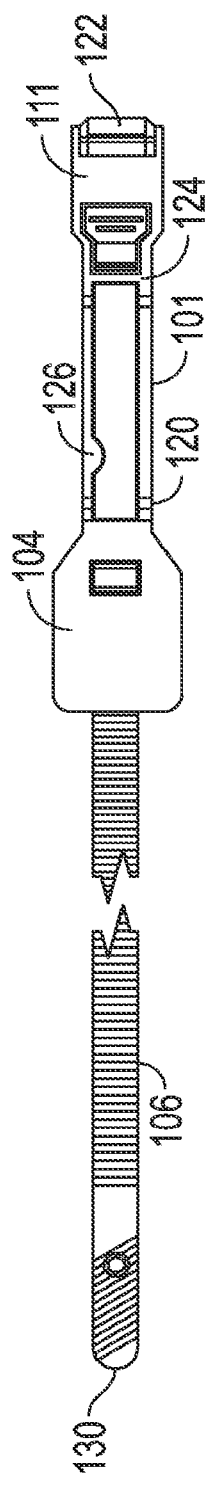
FIG. 30 is a top view of the seal of FIG. 29.
Figure 31:
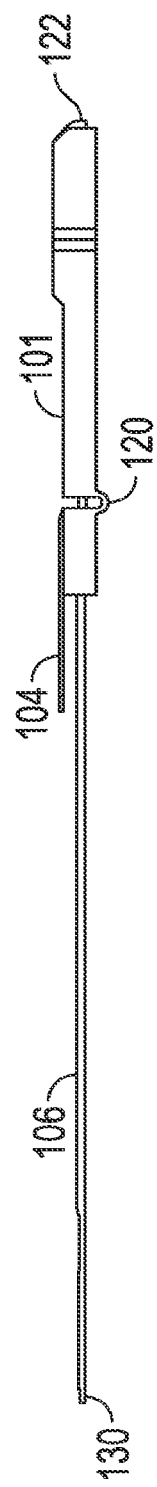
FIG. 31 is a side view of the seal of FIG. 29.

In one preferred embodiment, the body 1 includes a tail portion 6 that is approximately 9 inches long and approximately ¾ inch wide. The tail portion 6 is similar to a zip tie and is preferably integral with the body 1 and made from the same material. The tail portion 6 is inserted through the clasping members 11 and the end clasping member 7 to attach the seal to a delivery vessel. These clasping members 11 and 7 are located on the back side of the body 1, and some are located on the tear off portion 10 on the body 1. Preferably, the body 1 includes a first main perforation 8 where one can begin removing the tear off portion 10. There can be more perforations that form perforated lines 9 that can extend across the body 1 allowing for the back side to be torn off to expose an inner portion of the body 1A. Preferably, the perforated lines 9 at least partially define the tear off portion 10. FIG. 26 illustrates the tail portion 6 extending through the clasping members 11 and 7 on the back side of the body 1. FIG. 28 further illustrates an embodiment of a seal with a body 1 and tail portion 6 extending through a clasping member 11. Preferably, the clasping member 11 includes securing features that engage the tail portion 6 and securely hold the tail portion 6 within the clasping member 11.

As illustrated in FIG. 27, the tear off portion 10 on the back side of the body 1 can be at least partially torn off or pulled back from the body 1. When the tear off portion 10 is removed or pulled back, it reveals the hidden number or code 13. This hidden number 13 matches the number assigned to that particular delivery and corresponds to the barcode 5 and other information for that delivery. The body 1 can also include a batch number 14 located on the back side of the body 1 and preferably covered by the tear off portion 10. This batch number is a multiple digit stamp and can also include the date or other information relating to the delivery. Within the system server, each seal has its own fields containing the barcode data/information 5, the corresponding hidden number 13 and the batch number 14.

FIGS. 29 through 33 illustrate another preferred embodiment of a seal that can be used in a delivery tracking system. The seal includes a body 101 that is preferably made from nylon or some other plastic or polymer material. The seal also includes a tab portion 104 coupled to the body 101. Preferably, the tab portion 104 includes a flat surface that is rectangular in shape. The body 101 includes a clasping member 111 and in some embodiments can include multiple clasping members. The seal also includes a tail portion 106. Preferably, the tail portion 106 has a first end that is coupled to the body 101 at a location adjacent the clasping member 111. The tail portion 106 has a second end 130 that is at the opposite end of the tail portion 106 and extends away from the body 101 when the seal is not attached or closed.

The body 101 includes an end or opening 122 that is configured to receive the second end 130 of the tail portion 106 so that the second end 130 of the tail portion 106 enters through the opening 122 and engages the clasping member 111. The second end 130 of the tail portion 106 can pass through the clasping member 111 and can pass along or through the body 101 toward the tab portion 104. Thus, the tail portion 106 is secured by the clasping member 111 and overlaps with itself and its first end along the body 101 of the seal. Preferably, the second end 130 of the tail portion 106 passes between the tab portion 104 and the body 101 and/or first end of the tail portion 106. The body 101 can also include a recess through which the portions of the tail portion 106 extend. It can also include securing members 126 and 124 that secure the tail portion 106 within or close to the body 101.

Preferably, the seal body 101 includes a thinner break portion 120 that provides an area in the body 101 that can be cut or broken to remove the seal. As illustrated, the break portion 120 can be a thinner connection area between the body 101 and the tab portion 104. The break portion 120 can also extend outward and away from the plane of the body 101. Preferably, the break portion 120 is located near the end of the body 101 opposite the end or opening 122 and the clasping member 111. The break portion 120 can be made from the same material as the body 101 and can be thinner relative to the body 101 so that it is easier to cut or break. In other embodiments, the break portions 120 can be made from a different material that is easier to break or cut than the body material. Preferably, the break portion 120 also indicates where the seal should be broken or cut so that a user does not cut through the hidden code or other information contained on the seal.

Figure 32:
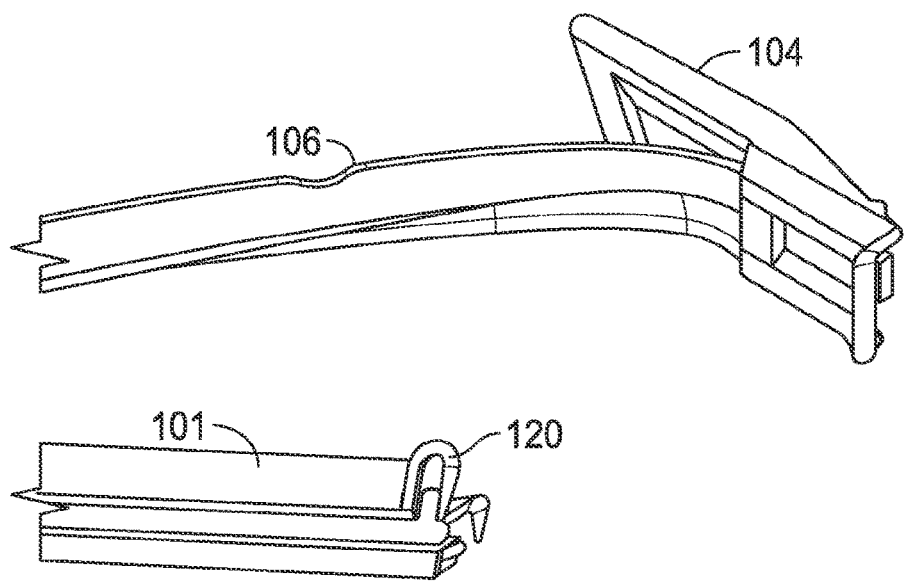
FIG. 32 is an additional view of the seal of FIG. 29 with the seal broken.
Figure 33:
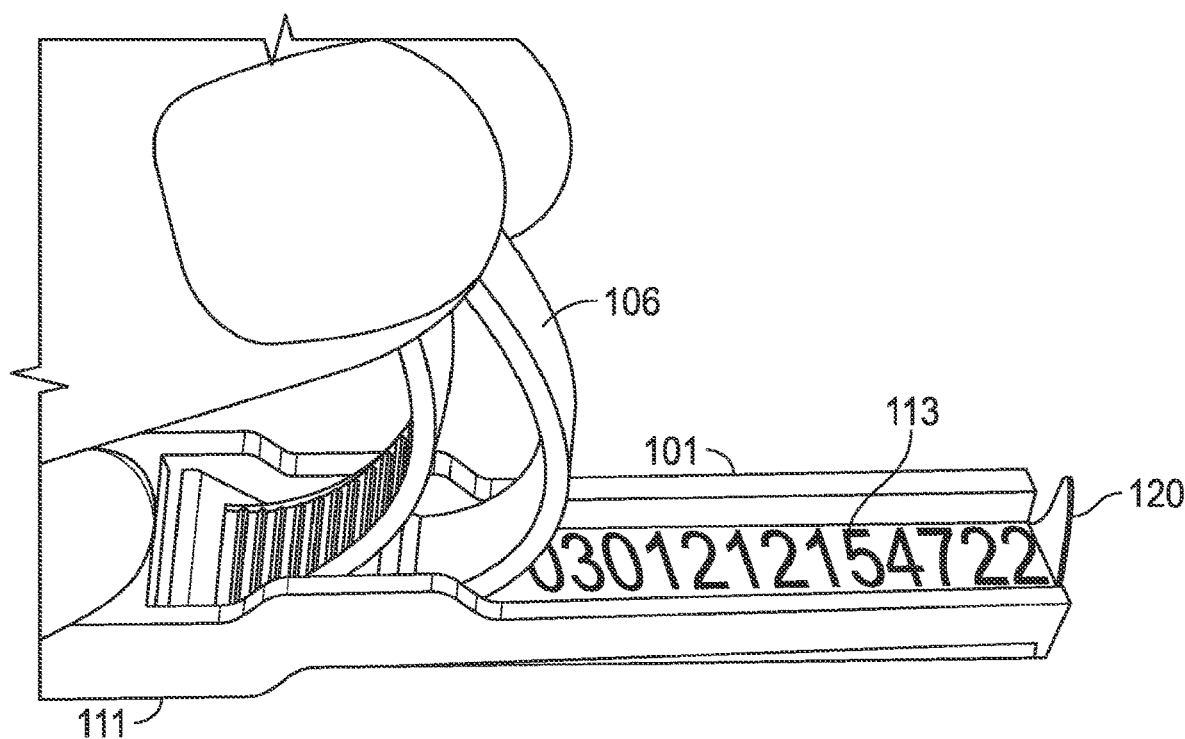
FIG. 33 is an additional view of the seal of FIG. 29 with the seal broken.

FIGS. 32 and 33 illustrate a seal that has been broken or cut. Preferably, the seal is broken or cut at the break portion 120. The tail portion 106 is also broken or cut so that the seal can be removed. Preferably, the body 101 includes a hidden code or number underneath the tail portion 106. When the seal is broken or cut, the tail portion 106 can be pulled back, revealing the hidden number or code 113. Preferably, the hidden number or code 113 is underneath the tail portion 106 so that it is not viewable unless the seal, including the tail portion, is broken or cut. Once the seal is cut or broken, it cannot be reattached or reconnected to the delivery vessel, without evidence of tampering and/or breakage. FIG. 33 illustrates a user's fingers pulling on the tail portion 106 and bending tail portion 106 back to reveal code 113.

Figure 34:
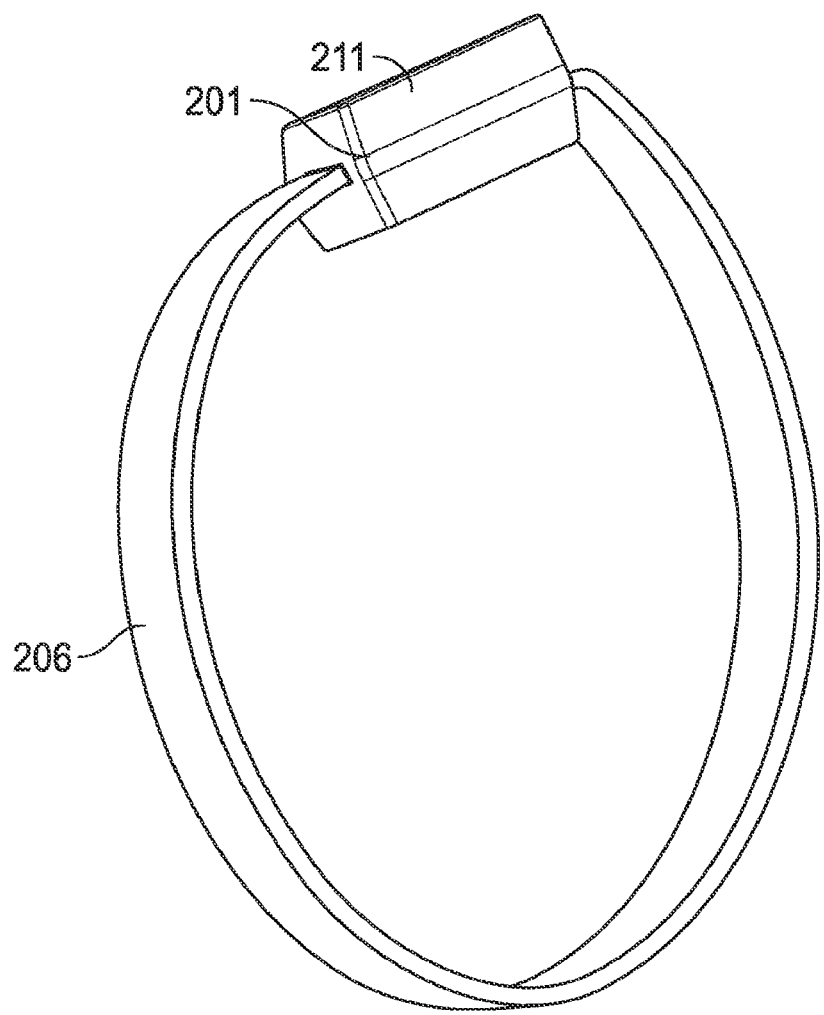
FIG. 34 is a perspective view of an embodiment of a seal used in a delivery tracking system.

FIG. 34 illustrates another preferred embodiment of a seal as it would be attached to a vessel or other structure. The tail portion 206 extends from one end of the body 201 and curves in an arch so that it enters the other end of the body 201. The body 201 includes a clasping member 211 that secures the tail portion 206 within the body 201 and prevents removal of the seal without cutting or otherwise breaking the seal. Preferably, the body 201 also includes a hidden number or code that is only viewable when the seal has been broken or cut.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present systems and methods have been described in the context of particularly preferred embodiments, the skilled artisan will appreciate, in view of the present disclosure, that certain advantages, features and aspects of the systems and methods may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A seal for use in tracking deliveries, the seal comprising:
   a body comprising:
      a tab portion having a flat surface and containing a form of data;
      at least one clasping member;
      a break portion configured to be broken by a user to remove the seal from a delivery vessel;
   a tail portion having a first end coupled to the body, the tail portion having a second end that is configured to be received by the clasping member so that the second end passes through and engages the clasping member such that the tail cannot be removed from the clasping member without breaking the seal;
   wherein the body includes a hidden code that is covered by the tail when the seal is installed, and when the seal is broken at the break portion the hidden code becomes viewable.

2. The seal of claim 1, wherein the break portion is thinner than the adjacent portions of the body.

3. The seal of claim 1, wherein the tail portion overlaps itself when the seal is attached to a vessel and the tail extends through the at least one clasping member, and the hidden code is covered by two segments of the tail portion.

4. The seal of claim 1, wherein breaking the seal at the break portion requires breaking the body and also breaking the tail portion adjacent the break portion of the body.

5. The seal of claim 1, wherein the body includes an opening that is configured to receive the tail portion, the opening being adjacent the at least one clasping members.

6. The seal of claim 5, wherein the body includes one or more securing members configured to keep the tail portion close to the body.

* * * * *